United States Patent
Ostein et al.

(10) Patent No.: US 11,731,189 B1
(45) Date of Patent: Aug. 22, 2023

(54) METHOD AND SYSTEM FOR MANUFACTURING ENGINE CONNECTION ROD ASSEMBLIES

(71) Applicant: Caterpillar Inc., Peoria, IL (US)

(72) Inventors: Adam William Ostein, Lafayette, IN (US); Larry E. Hensley, Lafayette, IN (US); Craig R. Martin, Otterbein, IN (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 17/702,086

(22) Filed: Mar. 23, 2022

(51) Int. Cl.
| | |
|---|---|
| *B21D 53/84* | (2006.01) |
| *B23B 3/06* | (2006.01) |
| *B23C 3/30* | (2006.01) |
| *B23Q 1/52* | (2006.01) |
| *B23B 1/00* | (2006.01) |

(52) U.S. Cl.
CPC ............ *B21D 53/84* (2013.01); *B23B 3/065* (2013.01); *B23C 3/30* (2013.01); *B23Q 1/52* (2013.01); *B23B 1/00* (2013.01); *B23C 2215/245* (2013.01); *B23P 2700/04* (2013.01)

(58) Field of Classification Search
CPC ..... B23C 2215/245; B23C 3/30; B23B 3/065; B23B 1/00; B21D 53/84; B23P 2700/04; B23Q 1/52
See application file for complete search history.

(56) References Cited

U.S. PATENT DOCUMENTS

| 5,918,575 A | 7/1999 | Toyota |
| 2016/0167187 A1* | 6/2016 | Burkhardt ............... B23Q 1/015 409/172 |
| 2017/0113311 A1* | 4/2017 | Ibarra ................. B23Q 11/0891 |

FOREIGN PATENT DOCUMENTS

| CN | 102476210 A | 5/2012 |
| CN | 106670809 A | 5/2017 |

OTHER PUBLICATIONS

Anurag Kar, Connecting Rod Manufacturing, Technical Report, Jan. 2019, ResearchGate. (30 pages).

* cited by examiner

*Primary Examiner* — Moshe Wilensky
(74) *Attorney, Agent, or Firm* — Bookoff McAndrews, PLLC (57) ABSTRACT

A method of manufacturing an engine connecting rod includes mounting a rod on a first mount configured to rotate, mounting a cap on a second mount configured to rotate, positioning a spindle head such that a tool of the spindle head contacts a first connecting end of the rod, machining the first connecting end by spinning the first mount, machining the first connecting end by moving the spindle head, positioning the spindle head such that the tool of the spindle head contacts a second connecting end of the cap configured to be coupled to the first connecting end, machining the second connecting end by spinning the second mount, and machining the second connecting end by moving the spindle head. The spindle head is moveable in a first direction extending between the first and second mounts, a second direction perpendicular to the first direction, a third direction perpendicular to the first and second directions, and rotatable about an axis.

17 Claims, 8 Drawing Sheets

METHOD AND SYSTEM FOR MANUFACTURING ENGINE CONNECTION ROD ASSEMBLIES

TECHNICAL FIELD

The present disclosure relates generally to manufacturing a component of an engine system, and more particularly, to manufacturing a connection rod of an engine system.

BACKGROUND

An engine connection rod assembly transfers power from a piston to a crankshaft in an internal combustion engine. A larger end of the engine connection rod assembly has an opening that connects to a crankshaft, while an opposite smaller end of the engine connection rod assembly has a hole for a piston pin that connects to the piston. The engine connection rod assembly thus converts a reciprocating motion of the piston to a rotational motion of the crankshaft.

The engine connection rod assembly may include two pieces, such as a rod and a cap. The cap may partially define the crankshaft end of the engine connection rod assembly. The rod and the cap are manufactured or machined to properly fit within the internal combustion engine, to fit around the piston pin and the crankshaft, and to enable separation and coupling between the rod and the cap.

CN 102476210 A, published May 30, 2012, discloses a double-side milling machine for processing a connection rod. The double-side milling machine includes two symmetrical milling mechanisms to simultaneously mill opposite side surfaces of the connection rod. The connection rod is linearly moved between the two milling mechanisms to be processed.

The method of manufacture of the present disclosure may solve one or more problems in the art. The scope of the current disclosure, however, is defined by the attached claims, and not by the ability to solve any specific problem.

SUMMARY

In one aspect, a method of manufacturing an engine connecting rod assembly may use a machine. The engine connecting rod assembly may include a rod and a cap. The rod may have a first connecting end. The cap may have a second connecting end configured to be coupled to the first connecting end. The method may include mounting the rod on a first mount configured to rotate, mounting the cap on a second mount configured to rotate, positioning a spindle head such that a tool of the spindle head contacts the first connecting end, machining the first connecting end by spinning the first mount, machining the first connecting end by moving the spindle head, positioning the spindle head such that the tool of the spindle head contacts the second connecting end, machining the second connecting end by spinning the second mount, and machining the second connecting end by moving the spindle head. The spindle head may be moveable in a first direction, moveable in a second direction perpendicular to the first direction, moveable in a third direction perpendicular to the first and second directions, and rotatable about an axis. The first direction may extend between the first and second mounts In another aspect, a method of manufacturing an engine connecting rod assembly may use a machine. The engine connecting rod assembly may include a rod and a cap. The rod may have a first connecting end, and the cap may have a second connecting end configured to be coupled to the first connecting end. The method may include mounting the rod on a first mount configured to rotate, mounting a cap on a second mount configured to rotate, and positioning a spindle head such that a tool of the spindle head contacts the first connecting end. The tool may be among a plurality of tools configured to be attached to and removed from the spindle head. The spindle head may be moveable in a first direction between the first and second mounts, moveable in a second direction perpendicular to the first direction, moveable in a third direction perpendicular to the first and second directions, and rotatable about a spindle head axis. The method may further include machining the first connecting end, positioning the spindle head such that the tool contacts the second connecting end, and machining the second connecting end.

In yet another aspect, a manufacturing system for manufacturing an engine connecting rod may include a plurality of tools configured for turning, milling, and/or drilling a metal material, a computer numerical control (CNC) mill turn machine, and an engine connecting rod assembly including a rod having a first connecting end. The CNC mill turn machine may include a first mount configured to rotate, a spindle head configured to be coupled to one of the plurality of tools, and at least one controller configured to control a rotation of the first mount and a movement of the spindle head in a first direction, in a second direction perpendicular to the first direction, in a third direction perpendicular to the first and second directions, and about an axis. The at least one controller may be configured to rotate the first mount and to move the spindle head to, without removing the rod from the first mount, turn an outer diameter of the rod, turn a joint face of the rod, turn a chamfer of the rod, mill an alignment groove of the rod, drill an oil passage through the rod, the oil passage extending in a longitudinal direction of the rod, and drill a plurality of bolt holes in the rod.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

Both the foregoing general description and the following detailed description are exemplary and explanatory only and are not restrictive of the features, as claimed. As used herein, the terms "comprises," "comprising," "has," "having," "includes," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. In this disclosure, unless stated otherwise, relative terms, such as, for example, "about," "substantially," and "approximately" are used to indicate a possible variation of ±10% in the stated value.

Figure 1:
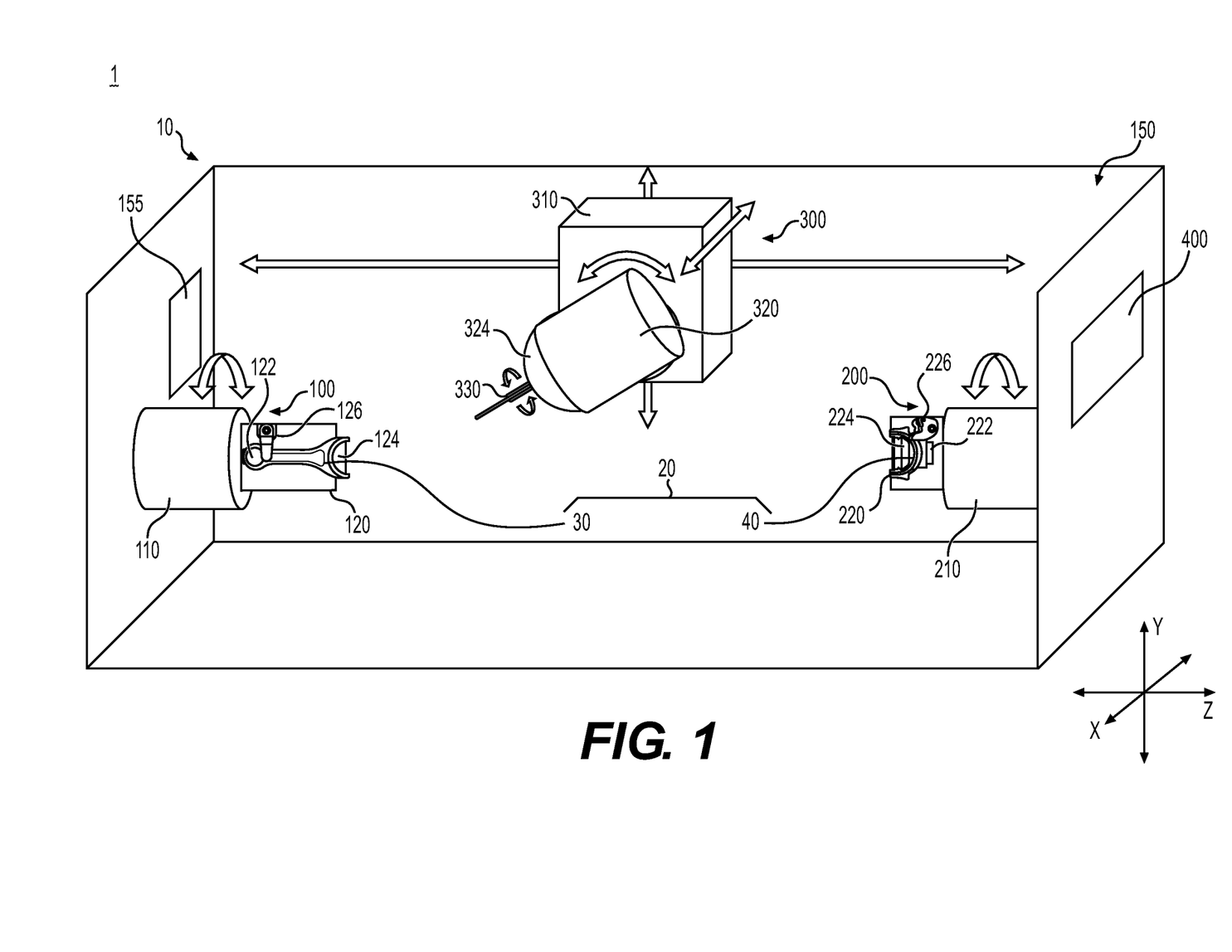
FIG. 1 is a front perspective view of an exemplary embodiment of a machining system including a mill turn machine and an engine connection rod assembly, according to aspects of the disclosure.
Figure 2:
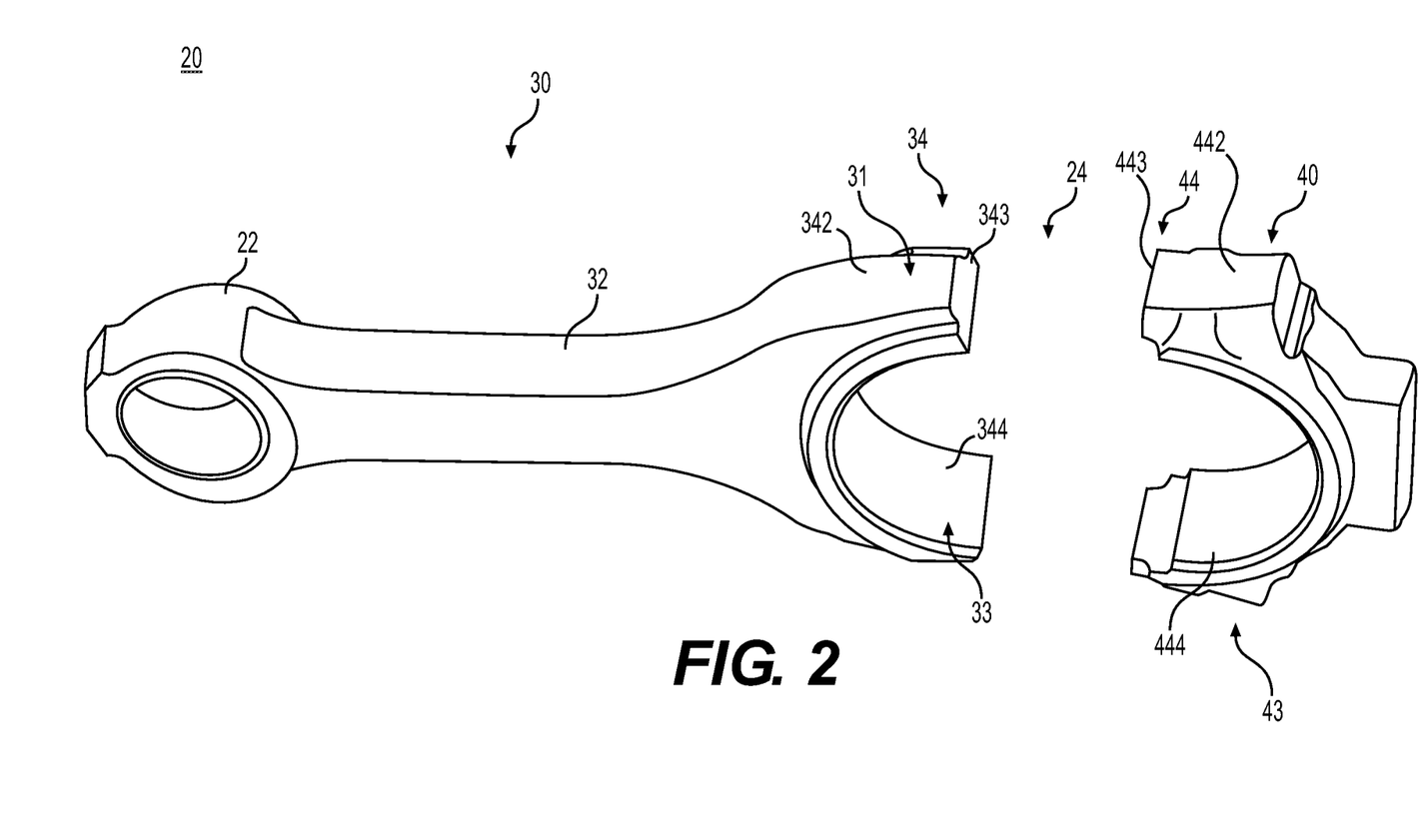
FIG. 2 is a perspective view of the engine connection rod assembly of FIG. 1 before a manufacturing process.
Figure 3:
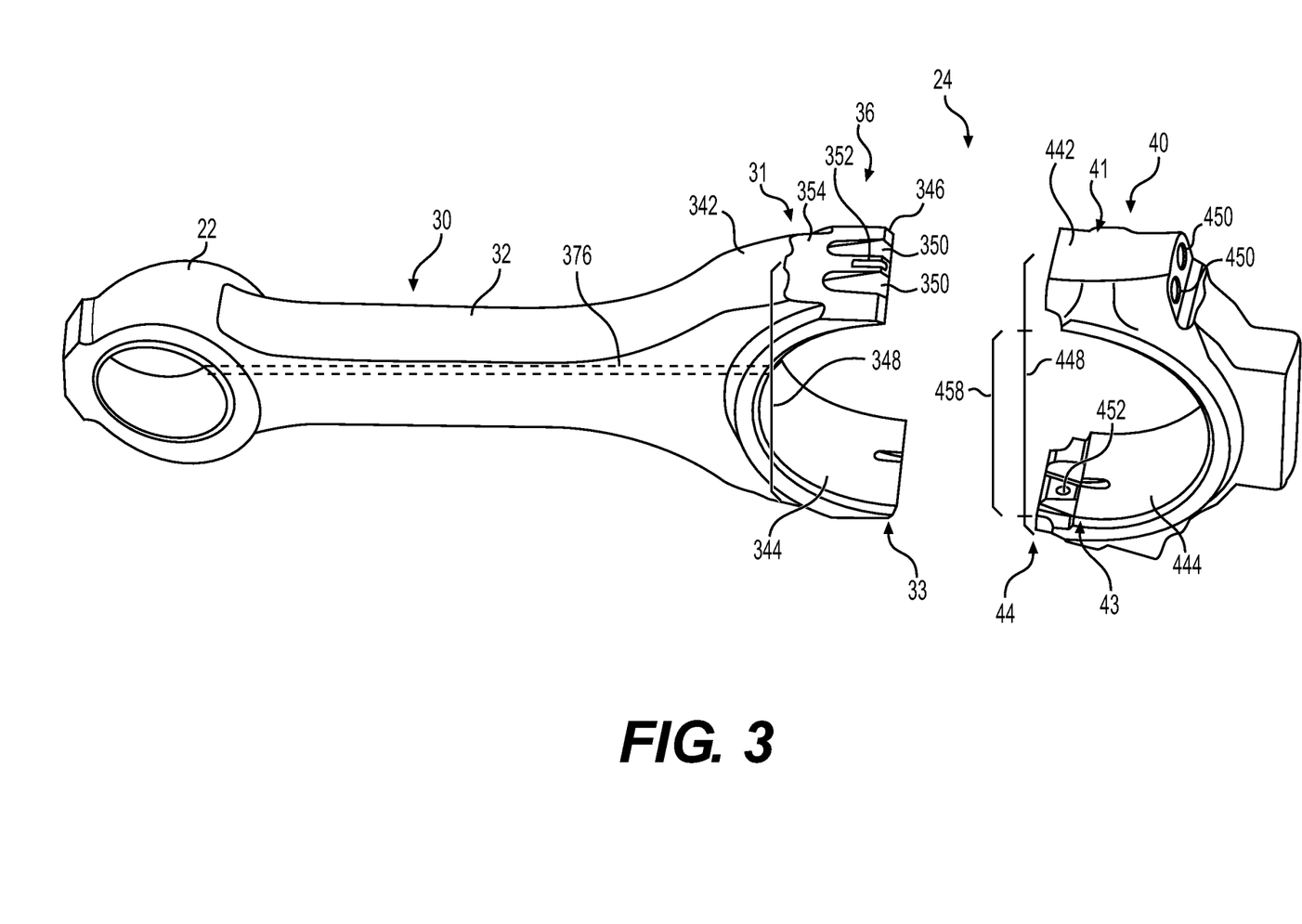
FIG. 3 is a perspective view of the engine connection rod assembly of FIG. 2 after the manufacturing process is completed.

FIG. 1 illustrates is a front perspective view of an exemplary embodiment of a machining or manufacturing system 1 including a computer numerical control (CNC) machine 10 such as a CNC mill turn machine and engine connection rod assembly 20 having a rod 30, a cap 40, a piston end 22, and a crankshaft end 24 (FIG. 2). The piston end 22 may be configured to couple to a piston of an engine (e.g., via a piston pin), and the crankshaft end 24 may be configured to couple to a crank shaft of the engine (e.g., via a bearing). For convenience of description, the CNC machine 10 will be describe as a mill turn machine 10. FIGS. 2-3 illustrate the connection rod assembly 20 without the mill turn machine 10.

Referring to FIGS. 1 and 2, the mill turn machine 10 may include a frame or support 150, a first mount 100, a second mount 200, a spindle head assembly 300 having a tool 330, and at least one controller 400. The mill turn machine 10 may be configured for "machining," processing, or contouring the engine connection rod assembly 20. "Machining" may include "milling" or "drilling," where the tool 330 is spun, and "turning," where the rod 30 and/or cap 40 is spun via the first and second mounts 100 and 200. The frame 150 may support the first and second mounts 100 and 200, the spindle head assembly 300, and the controller 400. The frame 150 may include a door or opening 155 to expose a tool changer (not shown) that changes the tool 330.

The first mount 100 may be rotatable about an axis extending in a Z-direction and include a first chuck 110 and a first fixture 120. The first chuck 110 may include a plurality of jaws configured to clamp down on and release a shaft, protrusion, and/or rear portion of the first fixture 120 for attachment and removal of the first fixture 120. The first fixture 120 may include one or more rod locators 122, 124 configured to maintain a position of the rod 30 and one or more rod clamps 126 to attach the rod 30 to the first fixture 120. The one or more rod locators 122, 124 may be inserted through the rod 30 to prevent sliding or displacement of the rod 30 on the first fixture 120. The at least one rod locator 122, 124 may include a first rod locator 122 and a second rod locator 124. The first rod locator 122 may be a circular attachment or protrusion configured to be received in the piston end 22 (FIG. 2). The second rod locator 124 may be a semicircular attachment or protrusion configured to be received in a portion of the rod 30 that defines the crankshaft end 24 (FIG. 2). The one or more rod clamps 126 may be configured to secure the rod 30 to the first fixture 120 at a shank 32 (FIG. 2), the piston end 22 (FIG. 2), and/or a first connecting end 34 (FIG. 2).

The second mount 200 may be rotatable about an axis extending in a Z-direction and may face and be aligned with the first mount 100. The second mount 200 may, for example, include a second chuck 210 and a second fixture 220. The second chuck 210 may include a plurality of jaws configured to clamp down on and release a shaft, protrusion, and/or a rear portion of the second fixture 220 for removal and attachment of the second fixture 220. The second fixture 220 may include one or more cap locators 222, 224 to maintain a position of the cap 40 and one or more cap clamps 226 to attach the cap 40 to the second fixture 220. The one or more cap locators 222, 224 may be inserted through the cap 40 to prevent displacement of the cap 40 on the second fixture 220. The at least one cap locator 222, 224 may include a first cap locator 222 and a second cap locator 224. The first cap locator 222 may be a rectangular attachment or protrusion provided at a closed side of the cap 40. The second cap locator 224 may be a semicircular attachment or protrusion received in an opened portion of the cap 40 defining the crankshaft end 24. The one or more cap clamps 226 may secure the cap 40 to the second fixture 220.

The spindle head assembly 300 may be configured to move between the first and second mounts 100 and 200 and may be moveable in a variety of directions. The spindle head assembly 300 may include a spindle head mount 310 and a spindle head 320 provided on the spindle head mount 310. The spindle head mount 310 may be configured to move laterally in the Z-direction between the first mount 100 and second mount 200, vertically in a Y-direction, and forward-backward in an X-direction to change a position of the spindle head 320. The X, Y, and Z directions may alternatively be referred to as first, second, and third directions. The spindle head 320 may be rotatably coupled to the spindle head mount 310 to rotate about an axis extending in the X-direction. The spindle head 320 may include a rotatable tool mount 324 provided at an outer end of the spindle head 320.

The one or more tools 330 may be removably coupled to the tool mount 324 of the spindle head 320 to rotate with the tool mount 324. The one or more tools 330 may be configured to remove material (e.g., metal such as steel) from and/or otherwise machine the rod 30 and the cap 40. The at least one tool 330 may include a plurality of tools 330 (e.g., lathe, disc, boring bit, or drill bit) configured to be removable from the tool mount 324 and replaced. The spindle head mount 310 may move in the X, Y, and/or Z-direction to the door 155, and the tool 330 may be automatically changed, or removed and replaced with another tool 330. The term "tool" herein refers to any one of the plurality of tools 330 and is not limited to a certain tool or a same tool previously mentioned.

The at least one controller 400 may control a movement of the first mount 100, the second mount 200, the spindle head mount 310, the spindle head 320, the tool mount 324, and/or the tool changer exposed through the door 155. The movements of the first mount 100, the second mount 200, the spindle head mount 310, the spindle head 320, the tool mount 324, and/or the tool changer may be preprogrammed based on desired machining operations to the rod 30 and cap 40, and the controller 400 may execute this programming via a non-transitory computer-readable medium and a processor configured to execute instructions stored on the non-transitory computer-readable medium. Although the at least one controller 400 is shown on an outer side of the frame 150, a position of the controller 400 is not limited.

FIG. 2 illustrates the engine connection rod assembly 20 before a manufacturing or machining process. FIG. 3 illustrates the engine connection rod assembly 20 after the mill turn machine 10 has been used to machine the rod 30 and the cap 20. Referring to FIGS. 2 and 3, the rod 30 and the cap 20 may be configured to be coupled (e.g., bolted) together to form the crankshaft end 24. As previously described, the rod 30 may include the piston end 22 and the shank 32, and may further include the first connecting end 34 and an oil passage 376. The shank 32 may extend between the piston end 22 and the first connecting end 34.

The first connecting end 34 may have a first side 31 and a second side 33. Before machining, the first connecting end 34 may include an outer surface 342, an inner surface 344, and a front surface 343 at the first and second sides 31 and 33.

Figure 4:
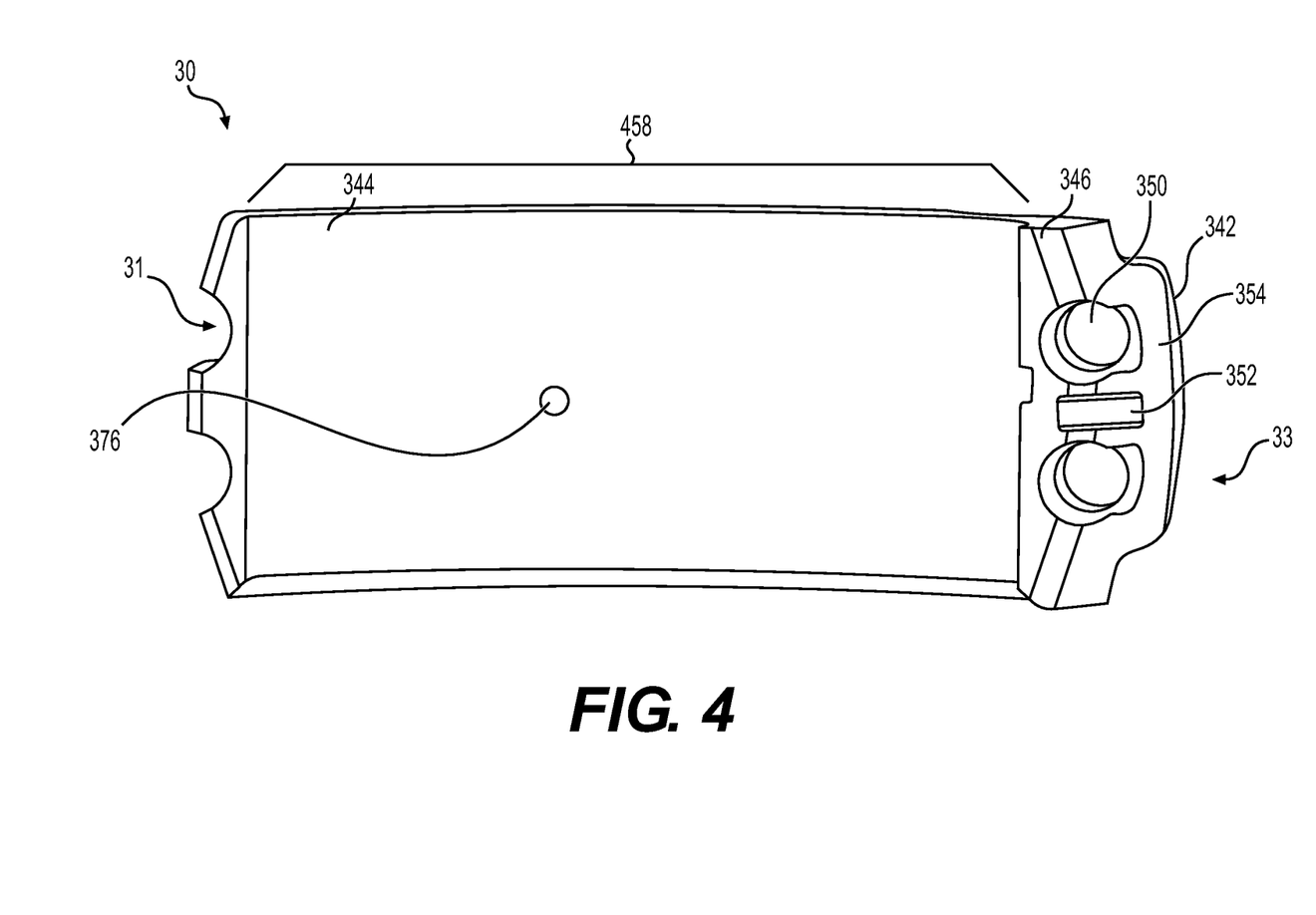
FIG. 4 is an enlarged front perspective view of a rod of the engine connection rod assembly of FIG. 1 after the manufacturing process is completed.

Referring to FIGS. 3 and 4, after machining, the first connecting end 34 may have an outer rod diameter 348, a chamfer or beveled edge 354, a first joint face 346, a plurality of bolt holes 350, and an alignment slot or groove 352. The outer rod diameter 348 may extend between the first and seconds sides 31 and 33 at the outer surface 342 and be less than a diameter of a cylinder liner in which the engine connection rod assembly 20 is provided.

The chamfer 354 may include an angled or beveled surface at each of the first and second sides 31 and 33 and extend between the machined first joint face 346 and the outer surface 342. The first joint face 346 may be a slightly angled surface. The plurality of bolt holes or slots 350 may include two pairs (e.g., upper and lower) of bolt holes 350 (where each pair has one bolt hole 350 at the first side 31 and one bolt hole 350 at the second side 33) configured to receive a bolt. The pairs of bolt holes 350 may extend through the first joint face 346 and chamfer 354, and form a blind bore in the first connecting end 34. The alignment groove 352 may be provided between upper and lower bolt holes 350.

The oil passage 376 may be configured to receive fluid and extend through the rod 30 in a longitudinal direction of the rod 30 between the inner surface 344 and the piston end 22. An end of the oil passage 376 may be formed in the inner surface 344 at an off-center position between the first and second sides 31 and 33 (best shown in FIG. 4).

Referring back to FIGS. 2-3, the cap 40 may have a second connecting end 44 configured to be coupled to the first connecting end 34 of the rod 30 to form the crankshaft end 24 of the engine connecting rod assembly 20. The second connecting end 44 may have a first side 41 and a second side 43. Before machining (FIG. 2), the second connecting end 44 may include an outer surface 442, an inner surface 444, and a front surface 443 at the first and second sides 41 and 43. The outer surface 442 may be tapered or angled (e.g., at 10 degrees with respect to a longitudinal axis of the engine connecting rod assembly 20).

Figure 5:
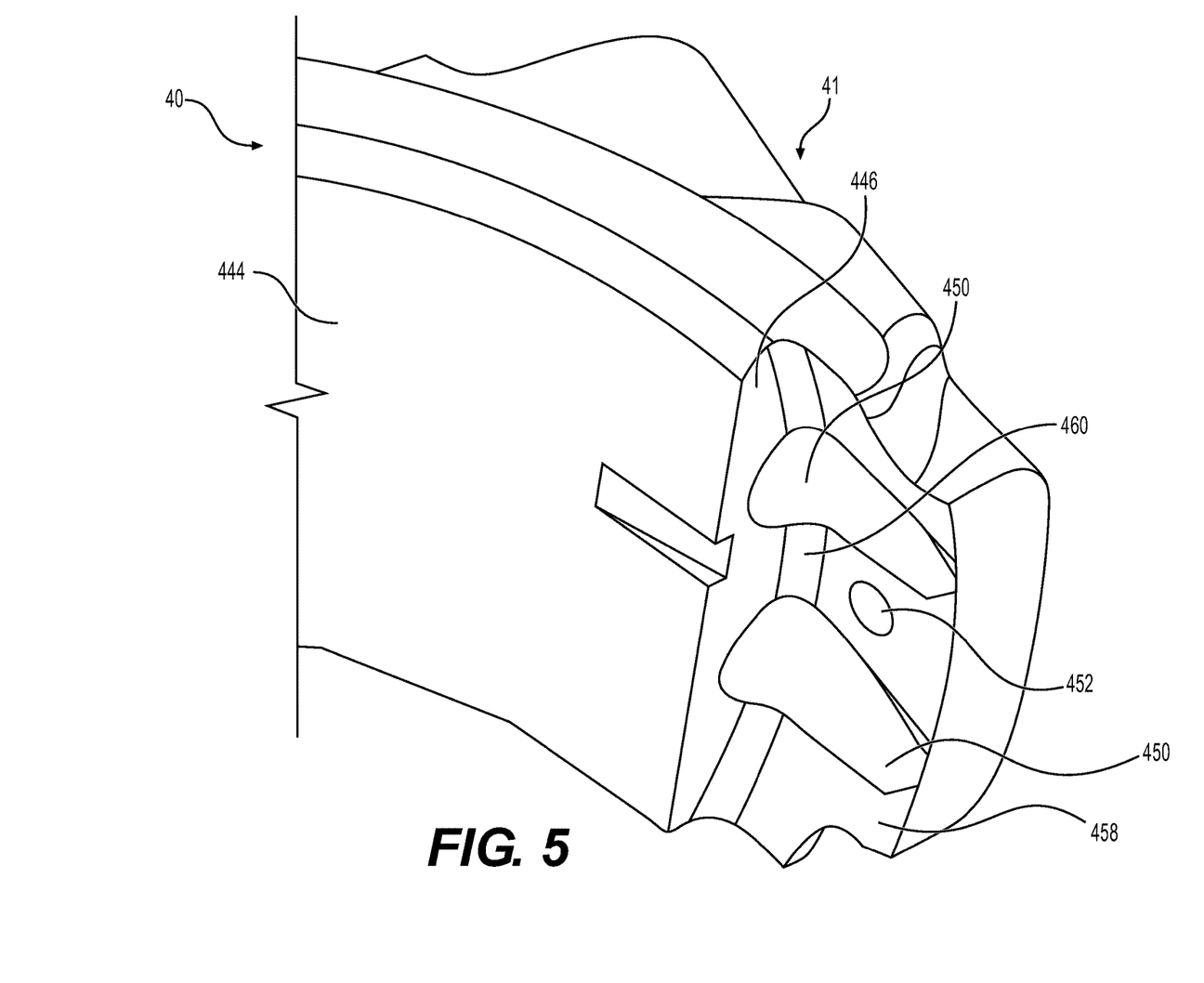
FIG. 5 is an enlarged, cut view of an inner surface of a cap of the engine connection rod assembly of FIG. 1 after the manufacturing process is completed.

The second connecting end 44 may be machined using the mill turn machine 10. FIG. 5 illustrates the first side 41 of the second connecting end 44 after machining. Referring to FIGS. 3 and 5, after machining, the second connecting end 44 (FIG. 3) may include an outer cap diameter 448, an inner cap diameter 458, a second joint face 446, a radius 460, a plurality of bolt holes 450, and an alignment or pin hole 452. The outer cap diameter 448 may be greater than the outer rod diameter 348 and inner cap diameter 458. The outer cap diameter 448 may be a distance from the first side 41 to the second side 43 at the outer surface 442. The outer cap diameter 448 may be equal to or greater than a diameter of the previously mentioned cylinder liner. The inner cap diameter 458 may be a distance from the first side 41 to the second side 43 at the inner surface 444. The inner cap diameter 458 may be equal to the outer rod diameter 348 or within 50 microns of the outer rod diameter 348.

The second joint face 446 may be a slightly angled surface configured to engage with the first joint face 346 of the rod 30. The radius 460 may be a curved surface extending between the inner surface 444 and the second joint face 446. The plurality of bolt holes 450 may be positioned to align with the plurality of bolt holes 350 of the rod 30 and may each be configured to receive a bolt to couple the cap 40 to the rod 30. The plurality of bolt holes 450 may include two pairs (e.g., upper and lower) of bolt holes 450 (where each pair includes one bolt hole 450 at the first side 41 and the other bolt hole 450 at the second side 43) that extend through the second joint face 446, radius 460, and inner surface 444. The bolt holes 450 may extend completely through the first and second sides 41 and 43 of the second connecting end 44 to the outer surface 442 (FIG. 3) and align with bolt holes 350 of the first connecting end 34.

The alignment hole 452 may be provided between upper and lower pairs of bolt holes 450 at the first and second sides 41 and 43 of the cap 40. The alignment hole 452 may be positioned to align with the alignment groove 352 of the rod 30. The alignment hole 452 may be configured to receive a dowel pin to maintain a position of the rod 30 and cap 40 during bolting.

Referring back to FIG. 3, after machining, the first side 31 of the first connecting end 34 may have a same shape or contour as the second side 33 of the first connecting end 34, and the first side 41 of the second connecting end 44 may have a same shape or contour as the second side 43 of the second connecting end 44. The first connecting end 34 may be symmetrical along a longitudinal axis of the engine connecting rod assembly 20 except with respect to the centrally offset oil passage 376 (FIGS. 3-4). The second connecting end 44 may be symmetrical along the longitudinal axis of the engine connecting rod assembly 20.

INDUSTRIAL APPLICABILITY

Referring to FIG. 1, the disclosed aspects of the manufacturing system 1 may be used to manufacture or machine the engine connection rod assembly 20. The manufacturing system 1 may combine various turning, milling, drilling, and other machining or processing methods into one method that may be automatically executed on one mill turn machine 10 without requiring removal of the rod 30 and the cap 40 from the first mount 100 and the second mount 200, respectively. The manufacturing system 1 may manufacture the rod 30 and cap 40 in a same manufacturing method using one mill turn machine 10 and in a same location.

Referring to FIGS. 1-11, the at least one controller 400 may be configured to control movements of the first mount 100, the second mount 200, the spindle head mount 310, the spindle head 320, the tool mount 324, and/or the tool changer exposed through door 155 according to a method 600 of manufacturing the engine connection rod assembly 20. The controller 400 may be configured to execute the method 600 according to CNC programming, which may be configured based on a type of workpiece (e.g., rod 30 and/or cap 40) and the types of machining to be performed.

Figure 6:
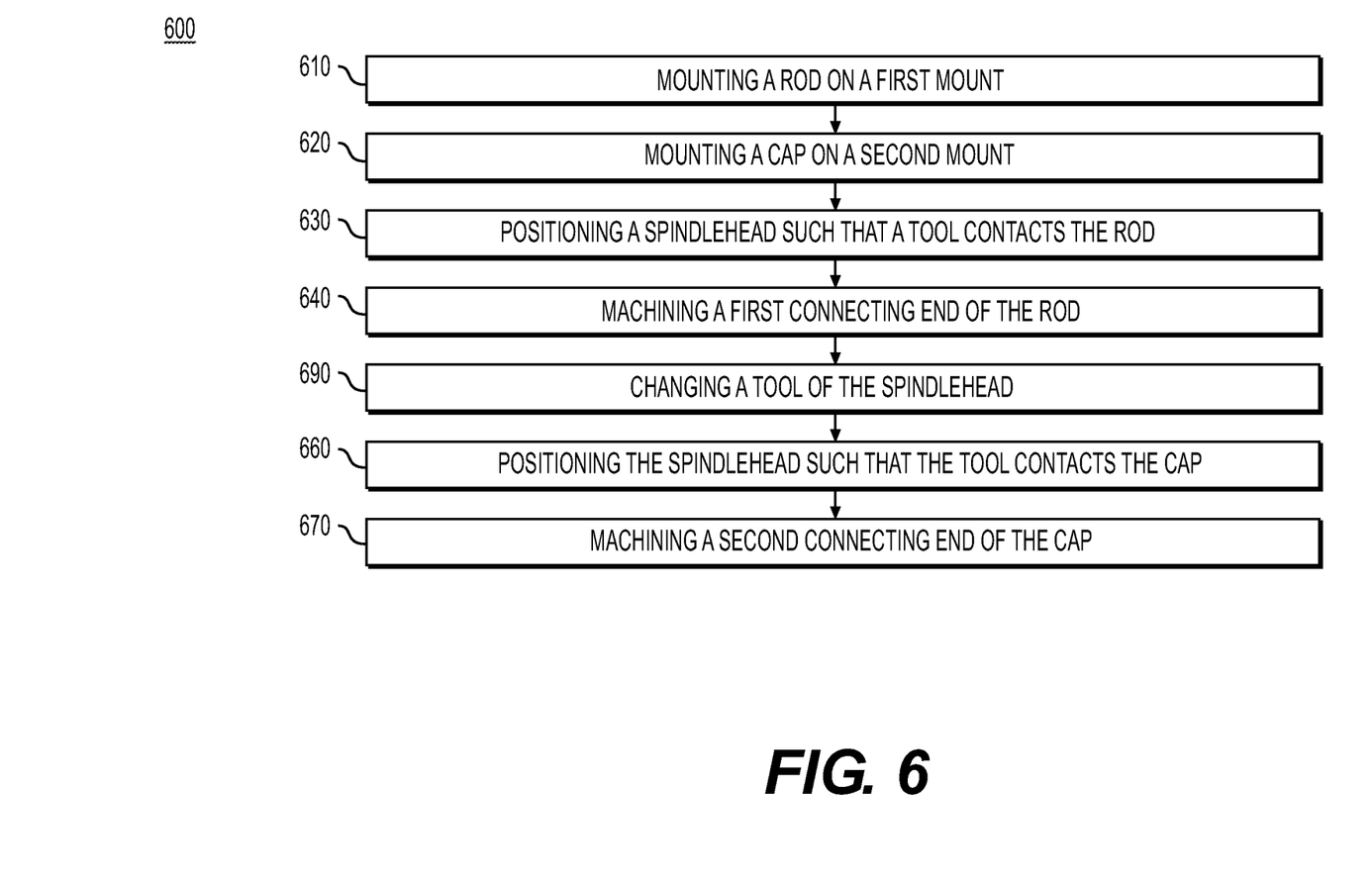
FIG. 6 is a flow chart of a manufacturing process using the manufacturing system of FIG. 1.

The method 600 may include mounting steps 610, 620 for the rod 30 and the cap 40, tool positioning steps 630, 660 for the rod 30 and the cap 40, machining or contouring steps 640, 670 for the rod 30 and the cap 40, and a tool changing step 690. Positioning steps 630 and 640, along with tool changing step 690, may be frequently repeated between various substeps of machining steps 640 and 670 as needed.

Steps 610, 620, 630, 640, 660, 670, and 690 may not necessarily occur in the order described herein. In addition, the method 600 may not necessarily include both the rod 30 and the cap 40; for example, the method 600 may include steps 610, 630, 640, and/or 690 involving the rod 30 and omit steps 620, 660, and 670 involving the cap 40 or vice versa. Certain steps may be repeated, such as positioning steps 630, 660 and the tool changing step 690. All or some of these steps 610, 620, 630, 640, 660, 670, and 690 may be performed without removing the rod 30 from the first mount 100 or removing the cap 40 from the second mount 200.

Mounting step 610 may include mounting the rod 30 on the first mount 100 by clamping the rod 30 to the first fixture 120 and securing the first fixture 120 to the first chuck 110. Mounting step 620 may include mounting the cap 40 on the second mount 200 by clamping the cap 40 to the second fixture 220 and securing the second fixture 220 to the second chuck 210.

Positioning steps 630 and 660 may include moving the spindle head mount 310 in the X, Y, and/or Z-directions and/or rotating the spindle head 320 such that the tool 330 contacts the rod 30 (step 630) and the cap 40 (step 660), respectively.

Machining steps 640 and 670 may include turning steps 642, 672 for the rod 30 and the cap 40, milling step 650 for the rod 30, and drilling steps 654 and 680 for the rod 30 and the cap 40. For convenience of description, machining steps 640 for machining the rod 30 will be described first, followed by machining steps 670 for machining the cap 40. However, an order of the steps is not limited to an order of the description; for example, both turning steps 642 and 672 for the rod 30 and the cap 40 may be performed before both drilling steps 654 and 680 for the rod 30 and the cap 40.

Tool changing step 690 may include moving the spindle head mount 310, spindle head 320, and/or tool mount 324 in the X, Y, and Z directions until the tool 330 is exposed through the door 155 to the tool changer (not shown) to automatically remove the tool 330 and attach a new tool 330 to the tool mount 324.

Machining the Rod

Figure 7:
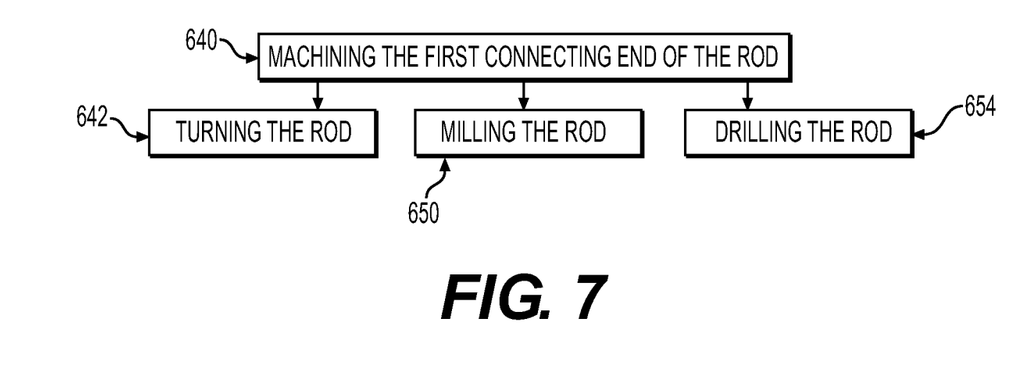
FIGS. 7-13 are flow charts describing substeps of the manufacturing process of FIG. 6.

Referring to FIG. 7, machining step 640 of machining the rod 30 may include one or more turning steps 642 of turning the first connecting end 34 of the rod 30, one or more milling steps 650 of milling the rod 30, and one or more drilling steps 654 of drilling the rod 30.

Figure 9:
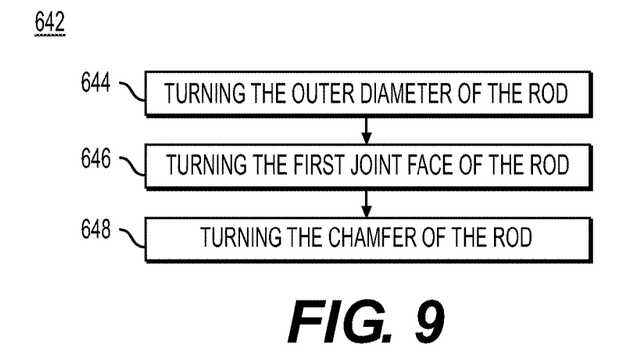

Referring to FIG. 9, the one or more turning steps 642 may include a step 644 of turning the outer rod diameter 348, a step 646 of turning the first joint face 346, and a step 648 of turning the chamfer 354. For any of the turning steps 644, 646, and 648, the tool 330 may be a lathe or a boring bit, and steps 644, 646, and 648 may alternatively be referred to as boring the outer rod diameter 348, boring the first joint face 346, and boring the chamfer 354. Each of the turning steps 644, 646, and 648 may include spinning the first mount 100 such that the outer surface 342 and the front surface 343 of the rod 30 is spun against the stationary tool 330 to remove material.

During step 644 of turning the outer rod diameter 348, material may be removed from the outer surface 342 until the outer rod diameter 348 is equal to a first predetermined diameter. During step 646 of turning the first joint face 346, material from the front surface 343 may be removed until the first joint face 346 has a desired thickness between chamfer 354 and inner surface 344, a desired slope or angle, or a desired shape or contour. During step 648 of turning the chamfer 354, material from the outer surface 342 and front surface 343 may be removed until the chamfer 354 has a desired slope or angle.

Figure 10:
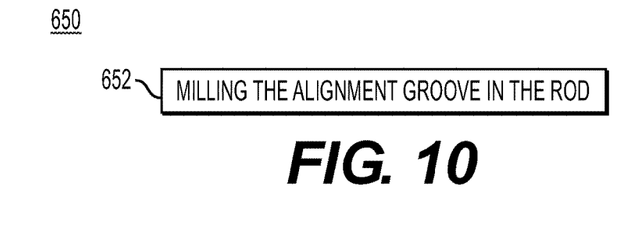

Referring to FIG. 10, milling step 650 may include a step 652 of milling the alignment groove 352 in the rod 30. Tool changing step 690 may be performed before step 652 of milling the alignment groove so that a previous tool 330 used (e.g., boring bit or lathe used for turning steps 644, 646, and/or 648) may be change to a milling tool, such as a rotating or milling disc. After tool changing step 690, positioning step 630 may be repeated to reposition the new tool 330 to align with a position on the outer surface 342 at the first side 31 of the first connecting end 34 where the alignment groove 352 is to be formed.

Step 652 of milling the alignment groove 352 may include positioning or orienting the first connecting end 34 by rotating the first mount 100 to a milling position where the rod 30 has a horizontal orientation (perpendicular to a vertical orientation shown in FIG. 1). Step 652 may include moving the spindle head mount 310 in the X-direction and/or along the Z-direction to mill the alignment groove 352 with the tool 330 until a desired depth and/or length of the alignment groove 352 is achieved. The process may be repeated at the second side 33 of the first connecting end 34 by either rotating the first mount 100 to an opposite horizontal orientation or by repositioning the spindle head mount 310 upward and over to the second side 33.

Figure 11:
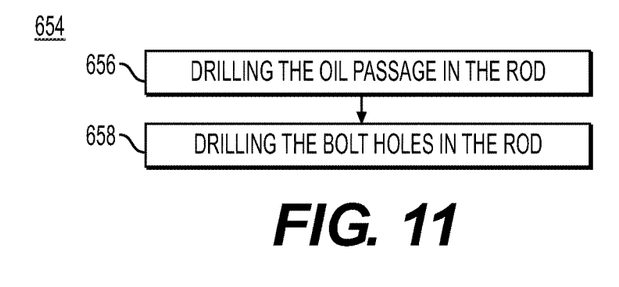

Before drilling step 654, tool changing step 690 may include changing a previous tool 330 (e.g., rotating disc) to a drilling tool 330 (e.g., drill bit). Referring to FIG. 11, drilling step 654 may include a step 656 of drilling the oil passage 376 in the rod 30 and a step 658 of drilling the bolt holes 350 in the rod 30. Step 656 of drilling the oil passage 376 may include positioning the first connecting end 34 by rotating the first mount 100 to a drilling position where the rod 30 has a vertical orientation, such as shown in FIG. 1. Before, after, or during positioning the first connecting end 34, positioning step 630 may be performed such that the tool 330 is aligned with the inner surface 344 of the rod 30 at a position where the oil passage hole 372 is to be formed and such that the tool 330 or the axis about which the tool 330 rotates is parallel to the Z-axis. The tool 330 may be aligned with a guide hole of the second locator 124. Step 656 of drilling the oil passage 376 may include moving the spindle head mount 310 in the Z-direction to drill the tool 330 through the second rod locator 124 and the rod 30 to form the oil passage hole 372.

Before step 658, the tool changing step 690 may include replacing a previous tool (e.g., a smaller drill bit) with a new drilling tool (e.g., a drill bit having a larger diameter). Step 658 of drilling the bolt holes 350 in the rod 30 may include positioning or orienting the first connecting end 34 by rotating the first mount 100 to a bolt hole drilling position where the rod 30 has the horizontal orientation. Before, after, or during positioning the first connecting end 34, step 630 of positioning the tool 330 may be performed such that the tool 330 is aligned with a position for the bolt hole 350 in the first side 31 and is parallel to the Z-direction. Step 658 may include moving spindle head mount 310 in the Z-direction toward the first joint face 346 and chamfer 354 to drill a first (e.g., upper) bolt hole 350 using the tool 330. To drill a second (e.g., lower) bolt hole 350, the spindle head mount 310 may be repositioned in the Y-direction. The process may be repeated at the second side 33 by rotating the first mount 100 by 180 degrees or by repositioning the spindle head mount 310 to the second side 33.

Machining the Cap 40

Figure 8:
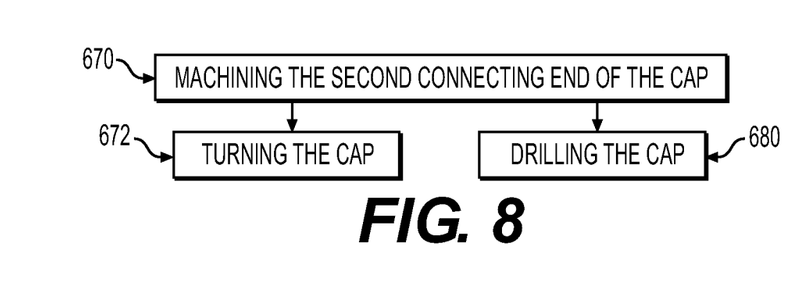

Machining steps 670 of machining the cap 40 may include turning steps 672 of turning the second connecting end 44 of the cap 40 and drilling steps 680 of drilling the cap 40 (FIG. 8). Although not described, machining step 670 of machining the cap 40 may also include milling operations. Turning steps 672 may keep tool 330 in place while the cap 40 is spun, while drilling step 680 may keep the cap 40 in place while the spindle head assembly 300 is moved.

Figure 12:
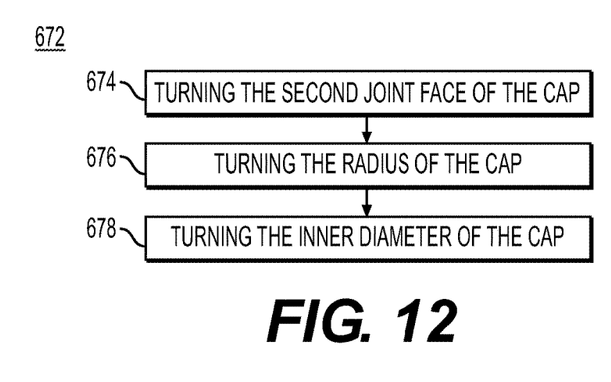

Referring to FIG. 12, turning step 672 may include a step 674 of turning the second joint face 446 of the cap 40, a step 676 of turning the radius 460 of the cap 40, and a step 678 of turning the inner cap diameter 458. For any of the turning steps 674, 676, and 678, the tool 330 may be a lathe or a boring bit. Each of the turning steps 674, 676, and 678 may include spinning the second mount 200 such that the inner surface 444 and front surface 443 of the cap 40 are spun against the stationary tool 330 to remove material.

Before step 674, positioning step 660 may be performed until the tool 330 is aligned with a predetermined position on the front surface 443 of the cap 40. The tool 330 may be parallel to the Z-direction. During step 674 of turning the second joint face 446, material from the front surface 443 may be removed as the cap 40 is spun against the tool 330 until the second joint face 446 has a desired thickness between inner surface 444 and radius 460 and/or a desired slope or angle. During step 676 of turning the radius 460, material may be similarly removed from the front surface 443 and the inner surface 444 until the radius 460 has a desired curvature. During step 678 of turning the inner cap diameter 458, material may be similarly removed from the inner surface 444 until inner cap diameter 458 is equal to a second predetermined diameter corresponding to (e.g., within 50 microns of) the first predetermined diameter.

Figure 13:
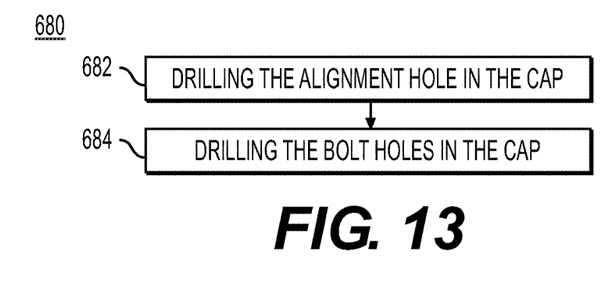

Referring to FIG. 13, drilling step 680 may include a step 682 of drilling the alignment hole 452 in the cap 40 and a step 684 of drilling the bolt holes 450 in the rod cap 40. Step 682 of drilling the alignment hole 452 may include positioning the second connecting end 46 by rotating the second mount 200 to a drilling position where the cap 40 has a vertical orientation, such as shown in FIG. 1. Before, after, or during positioning the second connecting end 46, positioning step 660 may position the tool 330 to align with the outer surface 442 of the cap 40 at a position for the alignment hole 452 and such that the tool 330 is parallel to the Y-axis. Step 682 of drilling the alignment hole 452 may include moving the spindle head mount 310 in the Y-direction to drill the alignment hole 452 at each of the first and second sides 41 and 43 of the cap 40.

Before step 682, the tool changing step 690 may include replacing a previous tool (e.g., a smaller drill bit) with a new drilling tool (e.g., a drill bit having a larger diameter). The step 682 of drilling the bolt holes 450 in the cap 40 may include positioning the second connecting end 44 by rotating the second mount 200 to a bolt hole drilling position where the cap 40 has a horizontal orientation. Before, after, or during positioning the second connecting end 54, step 660 of positioning the tool 330 may be performed such that the tool 330 is aligned with a position for one bolt hole 450 in the first side 41 of the cap 40 and is parallel to the Z-direction. Step 684 may include moving spindle head mount 310 in the Z-direction toward the second joint face 446 and radius 460 to drill a first (e.g., upper) bolt hole 450 using the tool 330. The spindle head mount 310 may be repositioned downward in the Y-direction to drill a second (e.g., lower) bolt hole 350. The process may be repeated at the second side 43 of the second connecting end 44 of the cap 40 by rotating the second mount 200 by 180 degrees or by repositioning the spindle head mount 310. In some examples, the bolt holes 450 may be angled to align with a 10 degree angle of the outer surface 442 of the cap 40. To drill angled bolt holes 450, the spindle head mount 310 may be moved simultaneously in multiple directions, such as the X and Z directions.

Although individual substeps 644, 646, 648, 650, 652, 656, 658, 674, 676, 678, 682, 684 are described in connection with turning steps 642 and 672, milling step 650, and drilling steps 654 and 680, these substeps 644, 646, 648, 650, 652, 656, 658, 674, 676, 678, 682, 684 may be performed in any order without removing the rod 30 or the cap 40 from the milling machine 10. For example, steps 644, 646, 648, 650, 652, 656, 658, 674, 676, 678, 682, 684 may be ordered based on a type of tool 330 used to reduce repetitions of tool changing steps 690, based on a workpiece (e.g., rod 30 or cap 40) to reduce movements during positioning steps 630 and/or 660, or based on orientations of the rod 30 and/or cap 40 to reduce repositioning. The rod 30 and the cap 40 may remain on the first and second mounts 100 and 200 of the mill turn machine 1 throughout performance of the method 600.

Aspects disclosed herein may be used with manufacturing machines 10 including mounts configured to rotate and/or move linearly, and tools configured to rotate and/or move linearly. A number of spindle head assemblies 300 and a location of the spindle head assembly 300 on the frame 150 are not limited to those shown in the figures. In addition, a configuration of the first and second mounts 100 and 200 is not limiting. For example, first and second chucks 110 and 210 may be implemented as other spinning heads, turret heads, or shafts. Various actuators and/or motors (not shown) may drive the spindle head mount 310, spindle head 320, tool mount 324, first and second mounts 100 and 200, etc.

Aspects of the present disclosure may reduce a number of machines required to manufacture an engine connection rod assembly. Because a number of machines may be reduced, time and labor required to move components (e.g., the rod and the cap) may be reduced, and costs may be reduced. A total manufacturing cost of producing the engine connection rod assembly may be reduced. In addition, because a number of steps and machines may be reduced, aspects of the present disclosure may simplify a manufacture of the engine connection rod assembly and reduce complex steps involved with multiple machines.

It will be apparent to those skilled in the art that various modifications and variations can be made to the disclosed system without departing from the scope of the disclosure. Other embodiments of the system will be apparent to those skilled in the art from consideration of the specification and practice of the system disclosed herein. It is intended that the specification and examples be considered as exemplary only, with a true scope of the disclosure being indicated by the following claims and their equivalents.

What is claimed is:

1. A method of manufacturing an engine connecting rod assembly using a machine, the engine connecting rod assembly including a rod and a cap, the method comprising:
    mounting the rod on a first mount configured to rotate, the rod having a first connecting end;
    mounting the cap on a second mount configured to rotate, the cap having a second connecting end configured to be coupled to the first connecting end;
    positioning a spindle head such that a tool of the spindle head contacts the first connecting end;
    machining the first connecting end by spinning the first mount;
    machining the first connecting end by moving the spindle head;
    positioning the spindle head such that the tool of the spindle head contacts the second connecting end;
    machining the second connecting end by spinning the second mount; and
    machining the second connecting end by moving the spindle head, wherein the spindle head is moveable in a first direction, moveable in a second direction perpendicular to the first direction, moveable in a third direction perpendicular to the first and second directions, and rotatable about an axis, and wherein the first direction extends between the first and second mounts.

2. The method of claim 1, wherein the machine is a CNC mill turn machine.

3. The method of claim 1, further comprising changing the tool of the spindle head.

4. The method of claim 1, wherein the tool is one of a boring bit, lathe, drill bit, or disc, and the second tool is another of the boring bit, lathe, drill bit, or disc.

5. The method of claim 1, wherein machining the first connecting end of the rod by spinning the first mount includes:
   spinning the first connecting end against the tool to remove material from the first connecting end until an outer diameter of the first connecting end is less than a diameter of a cylinder liner in which the engine connecting rod is configured to be provided, the tool being a boring bit.

6. The method of claim 1, wherein machining the first connecting end of the rod by spinning the first mount includes spinning the first connecting end against the tool to remove material from and shape a joint face of the rod.

7. The method of claim 1, wherein machining the first connecting end of the rod by spinning the first mount includes spinning the first connecting end against the tool to form a chamfer.

8. The method of claim 1, wherein machining the first connecting end of the rod by moving the spindle head includes milling an alignment groove in an outer surface of the rod.

9. The method of claim 1, wherein machining the first connecting end of the rod by moving the first mount includes drilling an oil passage through the rod, the oil passage extending in a longitudinal direction of the rod.

10. The method of claim 1, further comprising drilling at least one pair of holes in the first connecting end of the rod.

11. The method of claim 1, wherein the rod and the cap remain on the machine throughout performance of the method.

12. The method of claim 1, wherein machining the second connecting end of the cap by spinning the second mount includes spinning the second connecting end against the tool to remove material from and shape a second joint face, the second joint face configured to engage with a first joint face of the first connecting end of the rod.

13. The method of claim 11, wherein machining the second connecting end of the cap by spinning the second mount includes spinning the second connecting end against tool to form a radius connecting a second joint face to a portion of an inner surface of the cap.

14. The method of claim 11, wherein machining the second connecting end of the cap by spinning the second mount includes:
   spinning the second connecting end against the tool to remove material from the second connecting end until an inner diameter of the second connecting end is within 50 microns of an outer diameter of the first connecting end of the rod.

15. The method of claim 11, wherein machining the second connecting end of the cap by moving the spindle head includes drilling an alignment hole in the cap configured to align with an alignment groove of the rod.

16. A method of manufacturing an engine connecting rod assembly using a machine, the engine connecting rod assembly including a rod and a cap, the method comprising:
   mounting the rod on a first mount configured to rotate, the rod having a first connecting end;
   mounting a cap on a second mount configured to rotate, the cap having a second connecting end configured to be coupled to the first connecting end;
   positioning a spindle head such that a tool of the spindle head contacts the first connecting end, wherein the tool is among a plurality of tools configured to be attached to and removed from the spindle head, and the spindle head is moveable in a first direction between the first and second mounts, moveable in a second direction perpendicular to the first direction, moveable in a third direction perpendicular to the first and second directions, and rotatable about a spindle head axis;
   machining the first connecting end;
   positioning the spindle head such that the tool contacts the second connecting end; and
   machining the second connecting end.

17. The method of claim 16, further comprising changing the tool of the spindle head, wherein:
   machining the first connecting end includes at least one turning step and at least one milling or drilling step;
   the tool used during the at least one turning step is different from the tool used during the at least one milling or drilling step; and
   the rod is not removed from the first mount during machining the first connecting end.

* * * * *